(12) United States Patent
Kanamaru et al.

(10) Patent No.: US 12,320,820 B2
(45) Date of Patent: Jun. 3, 2025

(54) SAMPLE PRETREATMENT DEVICE, ANALYSIS SYSTEM INCLUDING THE DEVICE, AND AUTOSAMPLER

(71) Applicant: Shimadzu Corporation, Kyoto (JP)

(72) Inventors: Kuniaki Kanamaru, Kyoto (JP); Akiko Bamba, Kyoto (JP); Shunsuke Atsumi, Kyoto (JP); Hiroaki Murakami, Kyoto (JP); Yosuke Iwata, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 1067 days.

(21) Appl. No.: 17/285,575

(22) PCT Filed: Jul. 10, 2019

(86) PCT No.: PCT/JP2019/027315
§ 371 (c)(1),
(2) Date: Nov. 9, 2021

(87) PCT Pub. No.: WO2020/090159
PCT Pub. Date: May 7, 2020

(65) Prior Publication Data
US 2022/0074960 A1    Mar. 10, 2022

(30) Foreign Application Priority Data
Nov. 2, 2018 (JP) .................... 2018-207014

(51) Int. Cl.
*G01N 35/04* (2006.01)
*G01N 30/24* (2006.01)
(Continued)

(52) U.S. Cl.
CPC ............. *G01N 35/04* (2013.01); *G01N 30/24* (2013.01); *G01N 30/7233* (2013.01); *G01N 35/0099* (2013.01); *G01N 2035/0405* (2013.01)

(58) Field of Classification Search
CPC ...... G01N 1/28; G01N 35/04; G01N 35/0099; G01N 30/24; G01N 30/7233; G01N 2035/0405; G01N 2035/00306
See application file for complete search history.

(56) References Cited

U.S. PATENT DOCUMENTS 6,299,840 B1    10/2001    Watanabe et al.
2010/0211211 A1    8/2010    Nedu et al.

FOREIGN PATENT DOCUMENTS

EP    2 224 248 A2    9/2010
JP    H11-287809 A    10/1999
(Continued)

OTHER PUBLICATIONS

Espacenet English Translation of JP2002202315A (Year: 2002).*
(Continued)

*Primary Examiner* — Jennifer Wecker
*Assistant Examiner* — Kathryn Elizabeth Limbaugh
(74) *Attorney, Agent, or Firm* — Maier & Maier, PLLC (57) ABSTRACT

A sample pretreatment device of an aspect of the present invention includes a conveyance mechanism (22) including a Z-axis guide (223) that linearly moves in two axes of an X axis and a Y axis and expands/contracts in a Z-axis direction on a table (21) where a unit that performs each step of pretreatment is arranged. The Z-axis guide (22) is integrally provided with a liquid handler (224) and a grip handler (225) oriented in opposite directions to each other. A side wall of a housing (20) on the autosampler side is provided with a sample conveyance opening (201). When
(Continued)

pretreatment of a sample ends, the Z-axis guide (223) is moved to a position close to the opening (201) in a state where a gripper (228) grips a pretreated plate. An arm (227) enters a housing of the autosampler through the opening (201) and an opening formed in the autosampler, and sets a plate at a predetermined position. Thus, the sample pretreatment device can eliminate the labor of the worker setting a pretreated sample in the analysis device.

13 Claims, 4 Drawing Sheets

(51) Int. Cl.
*G01N 30/72* (2006.01)
*G01N 35/00* (2006.01)

(56) References Cited

FOREIGN PATENT DOCUMENTS

| JP | 2002202315 A | * | 7/2002 |
| JP | 2006-158335 A | | 6/2006 |
| JP | 2010-210237 A | | 9/2010 |
| JP | 2016-170079 A | | 9/2016 |

OTHER PUBLICATIONS

Espacenet English Translation of JP2016170079A (Year: 2016).*
Office Action issued on Dec. 29, 2023, in corresponding Chinese Application No. 201980066230.9, 20 pages.
International Search Report (with English translation) and Written Opinion (with machine translation) issued on Oct. 8, 2019 in corresponding International Application No. PCT/JP2019/027315; 14 pages.

* cited by examiner

SAMPLE PRETREATMENT DEVICE, ANALYSIS SYSTEM INCLUDING THE DEVICE, AND AUTOSAMPLER

FIELD

The present invention relates to a sample pretreatment device which performs a series of works and treatments related to pretreatment such as removal of a predetermined component, labeling of a predetermined component, concentration, or dilution regarding a liquid sample that is an analyte in an analysis device, an analysis system including the device and analyzing a liquid sample pretreated in the device, and an autosampler used in the analysis system. The sample pretreatment device according to the present invention is suitable for use in combination with a liquid chromatograph (LC) or a liquid chromatograph mass spectrometer (LC-MS) including an autosampler, in particular in order to sequentially and automatically analyze a large number of specimens.

BACKGROUND

In recent years, chemical analysis using LC, LC-MS, and the like has been widely used in a variety of fields, and as its use spreads, there has been a strong demand for more efficient and labor-saving analysis. In order to automatically select and sequentially analyze a large number of samples, such an analysis device uses an autosampler which performs operation of selecting, in accordance with a predetermined program, an appropriate sample from a large number of samples prepared in advance, collecting a predetermined amount of the sample, and sending it to the analysis device.

In analyses using analysis devices such as LC and LC-MS, pretreatment of the sample (specimen) that is an analyte is often performed. For example, in a case where the sample is derived from a living body such as blood (whole blood, serum, plasma, filter paper blood, and the like) or urine, and a quantitative analysis of a specific component in the sample is performed, pretreatment such as removing an undesired component that is unnecessary or obstructive to analysis, labeling a specific component, or extracting a specific component is commonly performed (see Patent Literature 1 and the like).

In research institutes, contract analysis facilities, and the like, for example, that need to efficiently analyze a large amount of sample, a relatively large-scale pretreatment device is used in order to perform sample pretreatment for a large amount of specimens. Such a pretreatment device normally includes the following two independent movable mechanisms, a dispense mechanism including a pipette and a small pump for dispensing a liquid reagent or sample, and a conveyance mechanism for gripping and conveying labware such as a well plate and a vial rack between units performing each step of pretreatment. Therefore, it is considerably larger in size than an analysis device. Such a large-scale pretreatment device is generally a stand-alone type device, and the labware containing the pretreated sample is conveyed from the pretreatment device to the analysis device manually by the worker.

Patent Literature 1: JP 2016-170079 A

SUMMARY

As described above, in the conventional sample pretreatment device, it is necessary for the worker himself to take out, from the device, the labware containing the liquid sample pretreated in the device and to set it at a predetermined position of the autosampler of the analysis device. Therefore, it requires manpower, which may result in an increase in analysis cost and a decrease in analysis efficiency. Since the reagent used is sometimes harmful to the human body, the worker needs to pay careful attention when conveying the labware containing the pretreated sample to the analysis device, and the burden on the worker is large.

Furthermore, in the conventional sample pretreatment device, the structure of the dispense mechanism and the conveyance mechanism is complicated, and hence the device is considerably large. Therefore, a large floor space is required to install the sample pretreatment device, and the installation place is restricted. As a result, there are many cases in which the sample pretreatment device and the analysis device cannot be arranged close to each other, and the labware conveying work by the worker described above is much more troublesome and time-consuming.

The present invention has been made to solve the above problems, and its main object is to provide a sample pretreatment device capable of conveying a pretreated liquid sample to a sample placement portion of an analysis device without manual intervention, an analysis system and an autosampler including the device.

Another object of the present invention is to provide a sample pretreatment device capable of reducing the installation floor space and improving the degree of freedom for the device layout by downsizing, and capable of reducing the cost of the device itself, an analysis system and an autosampler including the device.

A sample pretreatment device of the first aspect of the present invention, which has been made to solve the above problems, is a sample pretreatment device which performs pretreatment of a sample to be analyzed by an analysis device, including:

a housing which forms an outer shape of the sample pretreatment device;

a sample conveyance opening formed on a wall of the housing on a side where the analysis device is positioned; and a sample conveyance unit which includes a grip unit for gripping a sample container containing a sample having been pretreated in the housing, and which moves the grip unit in the housing and moves the grip unit to an inside of a housing of the analysis device through the sample conveyance opening and an opening formed in a housing of the analysis device.

The pretreatment performed in the sample pretreatment device of the first aspect of the present invention is not particularly limited, but it can be at least one or more of the following works and treatments if the sample is a liquid sample, for example: dispensing of liquid sample, dispensing of reagent (addition to the liquid sample), shaking/stirring, filtration, sealing, and the like. In that case, the sample pretreatment device of the first aspect of the present invention includes, in the housing, a plurality of units and stages for performing a series of steps related to each work and treatment.

The sample pretreatment device of the first aspect of the present invention is typically positioned close to the side of the analysis device. When the analysis device is composed of a plurality of units each having an independent housing, the sample pretreatment device of the first aspect of the present invention is installed on the side of the unit of the plurality of units in which the sample is to be set first. In this sample pretreatment device, the housing forming the outer shape has a sample conveyance opening of an appropriate size formed on the wall on the side where the analysis device is positioned. An opening having a similar size is formed also in the housing of the analysis device facing, i.e., adjacent to the sample conveyance opening of the sample pretreatment device.

In the sample pretreatment device of the first aspect of the present invention, the grip unit of the sample conveyance unit grips the sample container containing the sample having been pretreated in the housing of the device. The sample container is, for example, a vial rack containing plural small vials, or a microwell plate or deep well plate in which plural wells containing samples are formed. The sample conveyance unit moves the grip unit in a state of gripping the sample container to the inside of the housing of the analysis device by passing the grip unit through both the opening on the sample pretreatment device side and the opening on the analysis device side. When the sample container comes to a predetermined position in the housing of the analysis device, the grip unit releases the gripping to separate the sample container. Thus, the sample container containing the pretreated sample is automatically set at the predetermined position in the housing of the analysis device.

In this manner, the sample pretreatment device of the first aspect of the present invention can automatically convey the sample container containing the pretreated sample to a predetermined position in the housing of the analysis device installed adjacent to the sample container, for example, without manual intervention. The predetermined position in the housing of the analysis device can be, for example, a position in an autosampler or a rack changer, in which a vial rack or a well plate is contained.

In some units, such as an autosampler or a rack changer in an analysis device, that are required to temporarily store many samples, the inside of housing is temperature-controlled to a constant temperature in order to prevent denaturalization of the samples. In such case, it becomes difficult to perform stable temperature control if such units are provided with an opening that allows access from outside to inside of the housing.

Therefore, a sample pretreatment device of the second aspect of the present invention is the sample pretreatment device of the first aspect of the present invention which may further include a shutter configured to open or close the sample conveyance opening, wherein the shutter is in an opened state when the sample conveyance unit conveys the sample container from the sample pretreatment device to the analysis device, and the shutter is in a closed state when the sample conveyance unit does not convey the sample container from the sample pretreatment device to the analysis device.

According to the sample pretreatment device of the second aspect of the present invention, even in a state where the opening provided in the housing of the analysis device is opened, the sample conveyance opening is closed by the shutter in the sample pretreatment device, whereby the flow of air from the sample pretreatment device side to the analysis device side or vice versa can be blocked. This can stabilize the temperature inside the sample pretreatment device, for example, when the inside of the sample pretreatment device is temperature-controlled. In a case of temperature-controlling the inside of an autosampler, for example, of the analysis device to which the sample is conveyed, the temperature inside the autosampler can be stabilized.

A sample pretreatment device of the third aspect of the present invention is the sample pretreatment device of the first or second aspect of the present invention, wherein the sample conveyance opening and the opening of the analysis device are set to a size that allows the grip unit and the sample container gripped by the grip unit to pass through in a state where the sample pretreatment device and the analysis device are arranged in a predetermined positional relationship.

According to the sample pretreatment device of the third aspect of the present invention, the sample conveyance unit can smoothly convey the sample container to a predetermined position of the analysis device.

A sample pretreatment device of the fourth aspect of the present invention is the sample pretreatment device of the first to third aspects of the present invention, wherein the sample conveyance unit has a movable body capable of linearly moving in three axial directions orthogonal to one another in the housing, and the grip unit provided on the movable body.

According to the sample pretreatment device of the fourth aspect of the present invention, the movable body moves to an appropriate position in the housing in a three-dimensional manner, whereby the sample container placed at various positions in the housing can be gripped and smoothly moved to another position. In particular, by enabling the movement of the grip unit not only in the horizontal direction but also in the height direction, the sample container can be smoothly conveyed between the units and between the stages while avoiding obstacles, even when the units and the stages for carrying out each step in the pretreatment described earlier are arranged close to each other.

A sample pretreatment device of the fifth aspect of the present invention is the sample pretreatment device of the fourth aspect of the present invention, wherein the grip unit is provided on a surface of the movable body on the side where the analysis device is positioned, and a dispense unit that sucks and discharges a liquid is provided on a surface of the movable body on the side opposite to the side where the analysis device is positioned.

In the sample pretreatment device of the fifth aspect of the present invention, the dispense unit is used when collecting a predetermined amount of a liquid sample, adding a solvent to the collected liquid sample and diluting the liquid sample, or adding an appropriate reagent to the liquid sample. Since the sample pretreatment device of the fifth aspect has a configuration where the dispense unit and the grip unit move not independently but integrally, the mechanism for moving the dispense unit and the grip unit becomes simple, although sometimes there is a restriction that the dispense unit and the grip unit cannot perform their respective operation concurrently. Thus, the cost can be reduced and the space for providing such a mechanism can be reduced.

A sample pretreatment device of the sixth aspect of the present invention is the sample pretreatment device of the fifth aspect of the present invention, wherein the sample conveyance unit does not include a rotary drive mechanism that rotates the grip unit and the dispense unit, and the movable body linearly moves in three axial directions orthogonal to one another in a state where the grip unit always exists on the side where the analysis device is positioned and the dispense unit always exists on the side opposite to the side where the analysis device is positioned.

According to the sample pretreatment device of the sixth aspect of the present invention, the sample pretreatment device can be downsized.

A sample pretreatment device according to the seventh aspect of the present invention is the sample pretreatment device of the fifth aspect of the present invention, wherein the grip unit includes an arm and a gripper, and the length of the arm and the position of the gripper are set so that when the movable body moves to a predetermined position on the side where the analysis device is positioned, the sample container gripped by the gripper comes to a position corresponding to a location where the sample container is supposed to be arranged in the analysis device.

According to the sample pretreatment device of the seventh aspect of the present invention, even if, for example, the sample pretreatment device and the analysis device are separated to a certain degree, or even if a location where the sample container is supposed to set in the analysis device and the sample pretreatment device are separated to a certain degree, it is possible to reliably place the sample container gripped by the gripper in a location where the sample container is supposed to be set in the analysis device.

Further, a sample pretreatment device of the eighth aspect of the present invention is the sample pretreatment device of the fifth aspect of the present invention, wherein when the inside of the housing is viewed from top, a dispense-operable region, which is a range in which the dispense unit is movable, and a conveyance-operable region in which the grip unit can perform a conveyance operation are set so as to partially overlap with each other, and a unit requiring both a dispense operation and a sample conveyance operation in a pretreatment step is arranged in the overlap region, a unit requiring only a dispense operation in a pretreatment step is arranged in the dispense-operable region other than the overlap region, and a unit requiring only a sample conveyance operation in a pretreatment step is arranged in the conveyance-operable region other than the overlap region.

For example, it is possible to arrange, in a dispense-operable region other than the overlap region, a temperature-control unit (or cooling unit) that keeps a sample (mainly in a case of biological sample) before pretreatment at a low temperature, a reagent reservoir unit that holds a reagent reservoir containing a reagent, and the like. It is possible to arrange, in a conveyance-operable region other than the overlap region, a sealer unit that seals a sample container containing a pretreated sample, and a region for storing a spare sample container and the like. It is possible to arrange, in the overlap region, a unit that performs stirring and filtering by shaking, for example.

According to the sample pretreatment device of the eighth aspect of the present invention, it is possible to smoothly perform the operations of all the steps related to the pretreatment while providing the movable body with both the dispense unit and the grip unit. Since the movement distance of the movable body is shortened when sequentially executing the steps of pretreatment, it is advantageous to shorten the time required for pretreatment.

Further, a sample pretreatment device of the ninth aspect of the present invention is the sample pretreatment device of the eighth aspect of the present invention, wherein a unit requiring both a dispense operation and a sample conveyance operation in a pretreatment step includes at least one of a vacuum suction filtration unit and a constant-temperature shake unit, a unit requiring only a dispense operation in a pretreatment step includes a reagent reservoir unit, and a unit requiring only a sample conveyance operation in a pretreatment step includes at least one of a sealer unit and a storage area.

The sample pretreatment device of each of the above-described aspects according to the present invention can be combined with various kinds of analysis devices, and is particularly suitable for combination with an analysis device in which continuous automatic analysis is effective because analysis on one sample takes a relatively long time, and an analysis device that performs an analysis in which a sample that is an analyte requires a relatively troublesome pretreatment.

Therefore, an analysis system of the first aspect of the present invention is an analysis system including the sample pretreatment device of any one of the first to ninth aspects of the present invention and the analysis device, wherein the analysis device includes an analysis device body unit that performs analysis, and an autosampler that stores a plurality of samples to be analyzed in the analysis device body unit, sequentially selects the plurality of samples, collects the selected samples, and feeds them to the analysis device body unit, and the sample conveyance unit of the sample pretreatment device has a configuration of conveying the samples to the autosampler.

In the analysis system of the first aspect of the present invention, for example, the analysis device body unit can be a liquid chromatograph or a liquid chromatograph mass spectrometer.

An analysis system of the second aspect of the present invention is an analysis system including the sample pretreatment device according to any one of the first to ninth aspects of the present invention and the analysis device, wherein a housing of the sample pretreatment device and a housing of the analysis device are configured by one common housing.

That is, the sample pretreatment device and the analysis device are separate bodies in the analysis system of the first aspect of the present invention, and the sample pretreatment device and the analysis device are substantially integrated in the analysis system of the second aspect. The analysis system of any of the aspects does not require manual conveyance of the sample container. In the analysis system of the first aspect, the sample pretreatment device and the analysis device can be separated to a certain degree in a range where the sample conveyance unit can convey the sample. For that reason, the degree of freedom of arrangement of the units configuring the system is relatively high. On the other hand, the analysis system of the second aspect is advantageous in terms of cost because the housing is common. Since the sample container does not come out of the housing in the middle of conveyance from the sample pretreatment device to the analysis device, the safety in the case where the sample contains a substance potentially harmful to the human body, for example, is further enhanced.

An autosampler of the first aspect of the present invention is an autosampler used in the analysis system of the first aspect of the present invention, including a housing, and a sample reception opening formed on a wall of the housing on a side where the sample pretreatment device is positioned, wherein the grip unit of the sample conveyance unit that grips a sample container containing a sample having been pretreated in the housing of the sample pretreatment device is moved to the inside of the housing of the autosampler through the sample conveyance opening and the sample reception opening.

An autosampler of the second aspect of the present invention is an autosampler of the first aspect of the present invention, further including:

a shutter that opens/closes the sample reception opening, wherein the shutter is in an opened state when the sample conveyance unit conveys the sample container from the sample pretreatment device to the autosampler, and the shutter is in a closed state when the sample conveyance unit does not convey the sample container from the sample pretreatment device to the autosampler.

According to the autosampler of the second aspect of the present invention, when the sample container is not conveyed from the sample pretreatment device to the autosampler, the sample reception opening of the autosampler is closed by the shutter. This allows the temperature inside the autosampler to be kept more stable when temperature-controlling the inside of the autosampler. Since the temperature-controlled air is unlikely to escape to the outside, power consumption for temperature control can be suppressed.

According to the present invention, a sample having been pretreated in the sample pretreatment device can be conveyed and set without manual intervention at a predetermined position in the housing of the analysis device placed close to the sample pretreatment device. This allows labor saving in analysis work to be achieved. It is possible to reduce the risk to the worker if the pretreated sample contains a substance potentially harmful to the human body.

In particular, according to the sample pretreatment device of the fourth to eighth aspects of the present invention and the analysis system including the sample pretreatment device, it is possible to downsize the sample pretreatment device, which has been relatively large in size previously, it is possible to reduce the installation floor space of the device, and it is possible to improve the degree of freedom of the device layout. It is also possible to reduce the cost of the sample pretreatment device.

DETAILED DESCRIPTION

An LC-MS analysis system that is an embodiment of the sample pretreatment device according to the present invention and the analysis system including the sample pretreatment device will be described below in detail with reference to the accompanying drawings.

Figure 1:
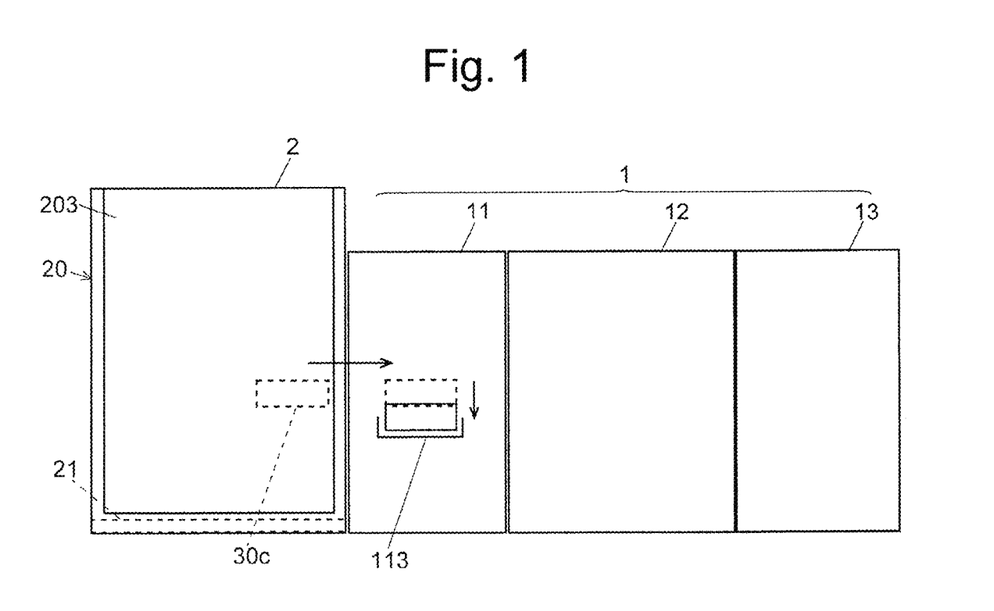
FIG. 1 is a schematic external front view of an LC-MS analysis system that is an embodiment of the present invention.

FIG. 1 is a schematic external front view of an LC-MS analysis system of the present embodiment.

The LC-MS analysis system of the present embodiment includes an analysis device 1 and a sample pretreatment device 2. The analysis device 1 includes an autosampler 11, a liquid chromatograph (LC) 12, and a mass spectrometry (MS) 13. These units are independent units, and are connected by appropriate piping and wiring that are not illustrated. FIG. 1 only shows what is placed on a dedicated table installed in, for example, an analysis room or a laboratory, and apart from this, a personal computer or the like that performs the overall control operation and data processing exists as a component of the LC-MS analysis system of the present embodiment.

In the present system, the analysis device 1 and the sample pretreatment device 2 are arranged in a predetermined positional relationship. The predetermined positional relationship means, as described in detail later, a position at which the sample container containing the sample pretreated in the sample pretreatment device 2 can be conveyed to the analysis device 1. As shown in FIG. 1, in the system of the present embodiment, the autosampler 11 is installed close to (in close contact with) the right of the sample pretreatment device 2 in front view. The sample pretreatment device 2 and the autosampler 11 may be slightly separated from each other.

The autosampler 11 is a device capable of containing a plurality of microplates (microwell plates or deep-well plates), and repeats, in accordance with a predetermined program, an operation of sucking a predetermined amount of a liquid sample stored in one well of one of the microplates and feeding the liquid sample to the LC 12. The microplate has plural wells. Here, the number of wells is, for example, 8×12=96, as an example.

The sample pretreatment device 2 has a function of carrying out a pretreatment of a liquid sample, and automatically setting, at a predetermined position (shown by a reference sign 113 in FIG. 1) in the autosampler 11, a microplate (shown by a reference sign 30c in FIG. 1) in a state where the pretreated liquid sample is stored. The sample pretreatment device 2 has a substantially rectangular parallelepiped housing 20, and at least a part of its front surface and upper surface is openable/closable by a door body 203 greatly openable upward.

Figure 3:
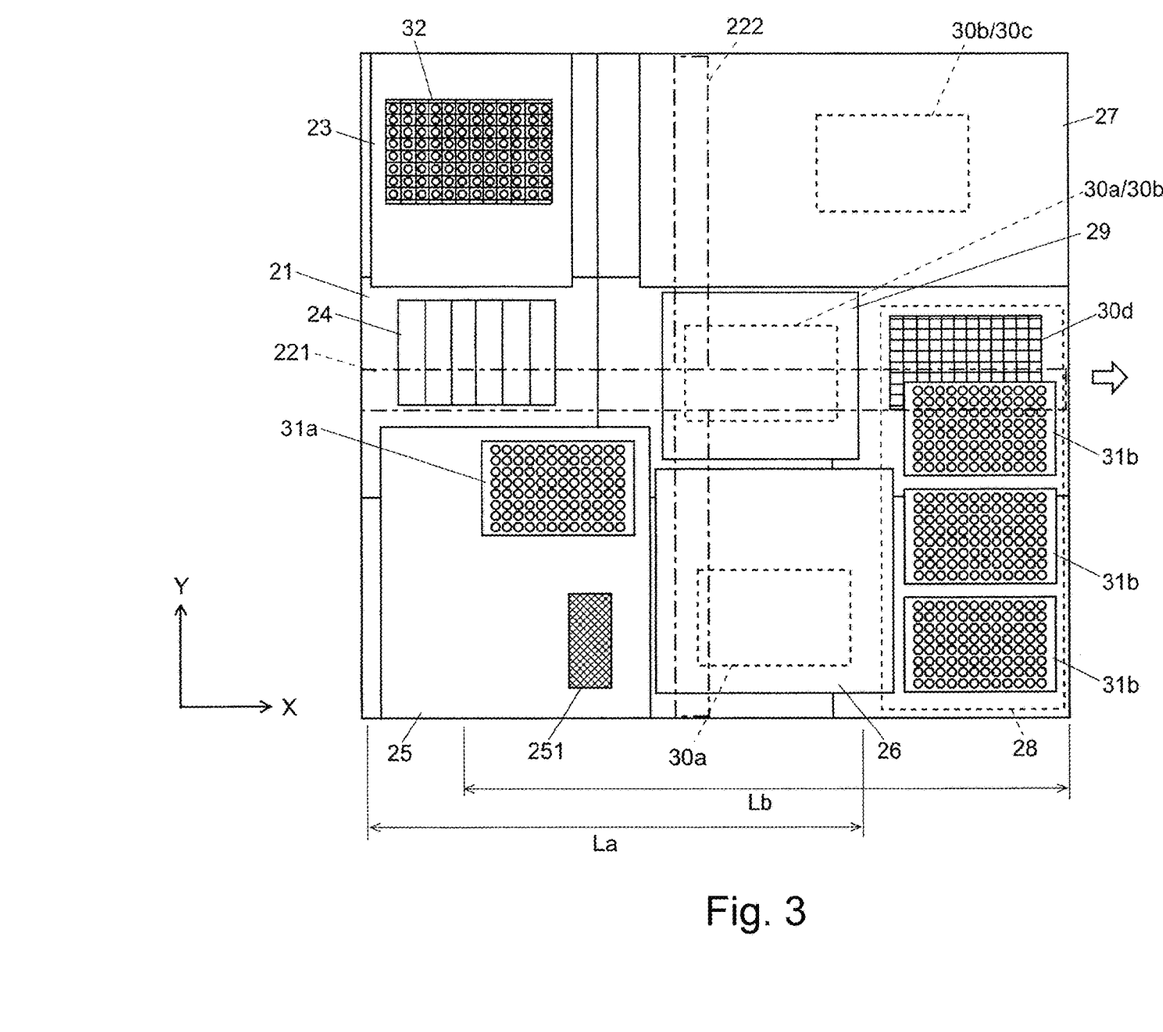
FIG. 3 is a schematic top plan view showing a two-dimensional arrangement of each unit of the sample pretreatment device in the LC-MS analysis system of the present embodiment.
Figure 4:
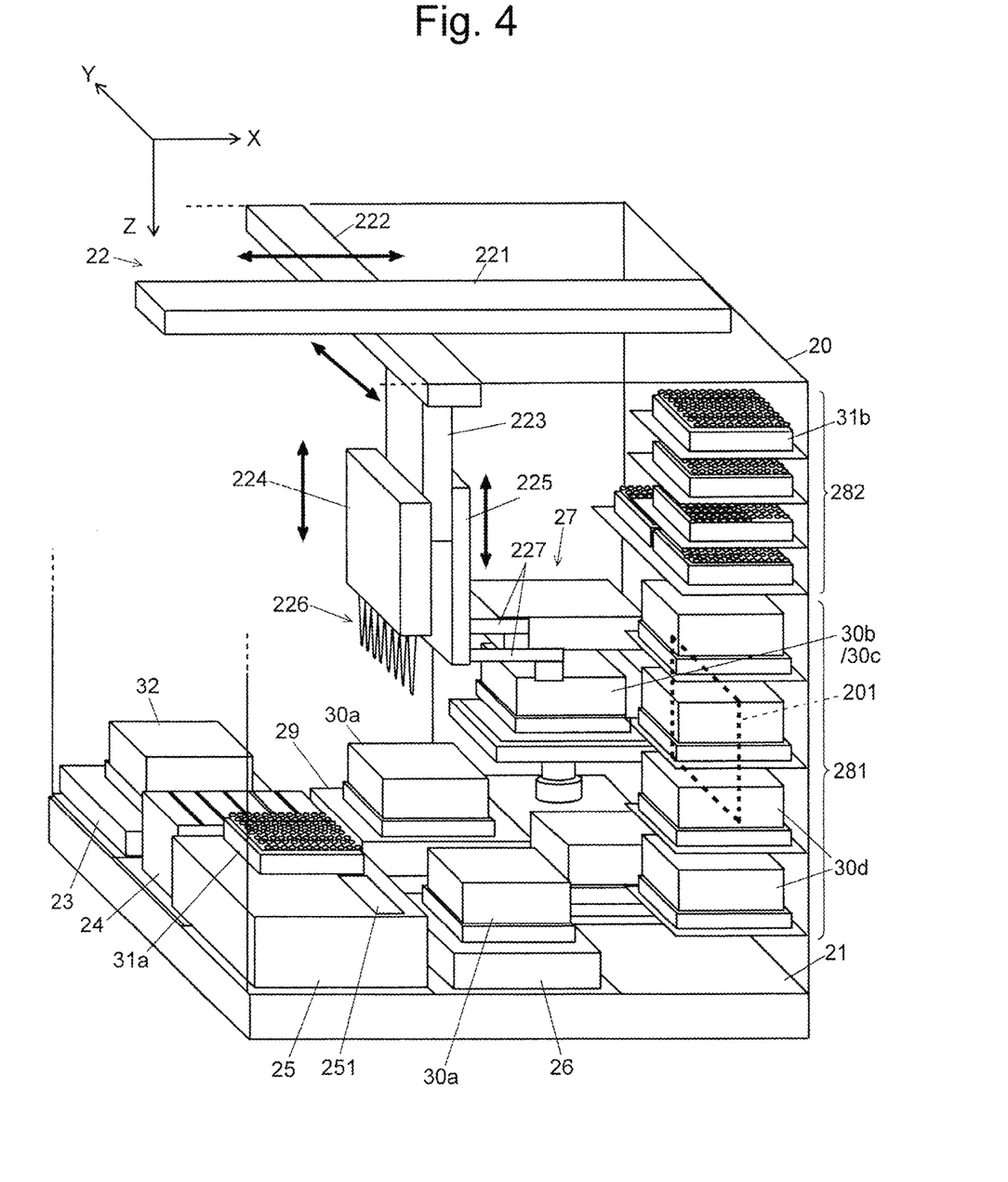
FIG. 4 is a schematic perspective view of an internal configuration of the sample pretreatment device in the LC-MS analysis system of the present embodiment.
Figure 5:
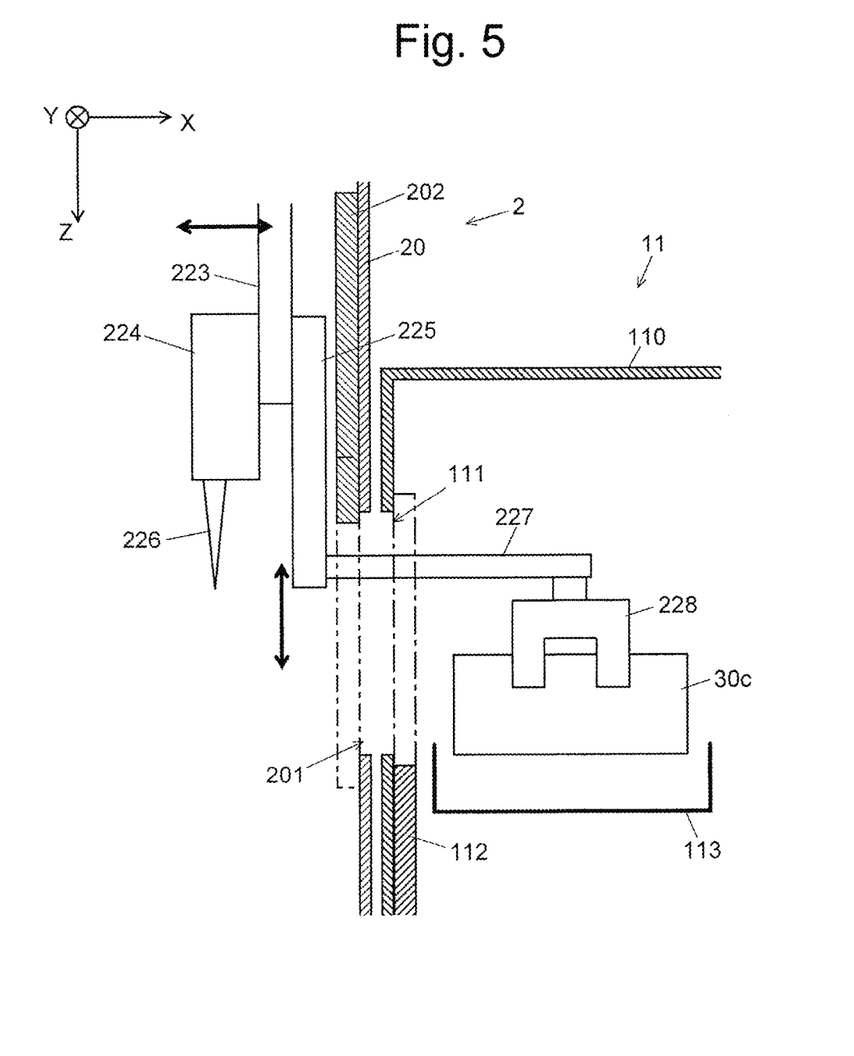
FIG. 5 is a schematic front plan view of an internal configuration for explaining the operation when transferring a microplate from the sample pretreatment device to the autosampler in the LC-MS analysis system of the present embodiment.

FIG. 3 is a schematic top plan view showing a two-dimensional arrangement of each unit in the sample pretreatment device 2. FIG. 4 is a schematic perspective view of the internal configuration of the sample pretreatment device 2. FIG. 5 is a schematic front plan view of the internal configuration for explaining the operation of conveying a microplate from the sample pretreatment device 2 to the autosampler 11. For convenience of explanation, as shown in FIGS. 3 to 5, three axes X, Y, and Z, which are orthogonal to one another, are defined. The X-Y plane, formed by the X-axis and the Y-axis, is a plane parallel to the top surface (i.e., installation surface of the device) of a dedicated table on which the sample pretreatment device 2 and the analysis device 1 are placed.

As shown in FIGS. 3 and 4, the sample pretreatment device 2 has a table 21 whose upper surface is parallel to the X-Y plane, and the entire space on the table 21 is surrounded by the housing 20 (however, FIG. 3 does not show the housing 20, and FIG. 4 shows only a part of the housing). The region on the table 21 is divided into a plurality of sections, and a temperature-control plate 23, a reagent reservoir unit 24, and a waste box 25 are arranged on the side (left side in FIG. 3) opposite to the side where the autosampler 11 is positioned. On the right of it, a sealer unit 27, a vacuum suction filtration unit 29, and a constant-temperature shake unit 26 are arranged. Further on the right of it, i.e., on the side where the autosampler 11 is positioned, the sealer unit 27 and the storage area 28 are arranged.

A space in the housing 20 above the table 21 is provided with a conveyance mechanism 22. The conveyance mechanism 22 includes an X-axis guide rail 221 extending in the X-axis direction and attached near the top surface in the housing 20, and a Y-axis guide rail 222 extending in the Y-axis direction and movable in the X-axis direction along the X-axis guide rail 221. The Y-axis guide rail 222 is attached with a Z-axis guide 223 movable in the Y-axis direction along the guide rail 222. The Z-axis guide 223 is attached with a grip handler 225 provided on the surface on the side (right in FIG. 3) where the autosampler 11 is positioned, and a liquid handler 224 provided on the surface on the side (left in FIG. 3) opposite to the side where the autosampler 11 is positioned that are integrally attached movably in the Z-axis direction. This allows the grip handler 225 and the liquid handler 224 to move in a predetermined three-dimensional range of the space in the housing 20 in the three axes directions of X, Y, and Z. The movement is achieved by a plurality of drive mechanisms including a motor that is not illustrated.

Here, a rotary drive mechanism that rotates the liquid handler 224 and the grip handler 225, which is often provided in the conventional device, in order to downsize the conveyance mechanism. Therefore, the liquid handler 224 and the grip handler 225 do not rotationally move. The grip handler 225 always exists on the side where the autosampler 11 is positioned, and the liquid handler 224 always exists on the side opposite to the side where the autosampler 11 is positioned.

The grip handler 225 has a pair of arms 227 separated by a predetermined distance in the Y-axis direction and movable so that the distance varies in a predetermined range. The tip of each arm 227 is attached with a gripper 228 that holds and grips a microplate or a chip rack described later. That is, the grip handler 225 conveys a microplate or a chip rack. The length of the arm 227 in the X-axis direction (i.e., direction in which the autosampler 11 is positioned) and the position at which the gripper 228 is formed are set so that when the guide rail 222 reaches the end portion on the autosampler 11 side in the X-axis direction, the microplate or the like gripped by the gripper 228 is at a position facing the upper portion of the microplate installation region, which is a predetermined position of the autosampler 11.

On the other hand, the liquid handler 224 detachably has a chipset 226 to which a plurality (eight in this example) of pipetting chips (hereinafter referred to simply as a "chip") are coupled, and performs dispense by sucking a liquid sample or a reagent into each chip of the chipset 226 and discharging the sucked liquid. The chipset 226 has the eight chips coupled at the same pitch as adjacent eight wells of the microplate so that a liquid can be simultaneously dispensed into the eight wells. A liquid sample or a reagent adheres to the chip, and hence, in order to avoid contamination, the chip unit is disposable and normally replaced automatically after each use.

The temperature-control plate 23 temporarily stores, at a predetermined temperature, a large number of liquid samples to be pretreated. On the temperature-control plate 23, for example, a vial rack 32 (or other labware) that holds plural small vials each containing a liquid sample is placed. When the liquid sample is a biological sample such as blood, the temperature-control plate 23 is set to a low temperature in the range of, for example, about 0 to 10° C. in order to prevent denaturalization of the components in the sample before pretreatment.

The reagent reservoir unit 24 holds a plurality of reagent reservoirs containing various kinds of reagent used for pretreatment. The reagents to be used vary depending on the purpose and type of pretreatment.

The waste box 25 has a waste port 251 opening upward and is for discarding used chips. As shown in FIGS. 3 and 4, a chip rack 31a containing plural (12 in this example) unused chip units can be placed on the flat upper surface of the waste box 25, and a new (unused) chip unit can be placed on the liquid handler 224 in this position.

The constant-temperature shake unit 26 shakes a microplate (filter-type microplate described later) 30a (or other labware) placed on the upper surface of the constant-temperature shake unit 26 while holding the microplate 30a at a predetermined temperature, thereby stirring the liquid in each well of the microplate 30a and accelerating the mixing and chemical reaction of the liquid sample with the reagent.

The vacuum suction filtration unit 29 includes a vacuum manifold, and performs filtration by performing vacuum suction to the microplate 30a corresponding to vacuum suction filtration, for example, to remove unnecessary components and the like from the liquid sample.

The sealer unit 27 substantially seals each well of a microplate 30b by attaching a predetermined sealing material to the upper surface of the microplate 30b containing the pretreated liquid sample. For convenience of explanation, a general microplate before the sealing material is attached by the sealer unit 27 is denoted by a reference sign 30b, and a general microplate after the sealing material has been attached is denoted by a reference sign 30c.

The storage area 28 includes a shelf-like first region 281 that stores a plurality of unused microplates (filter-type microplates and normal microplates) 30d and a shelf-like second region 282 that stores a plurality of chip racks 31b containing an unused chip.

At a predetermined position on the right side wall of the housing 20 facing the autosampler 11, a sample conveyance opening 201 is formed, and the sample conveyance opening 201 is openable/closable by a shutter 202. The sample conveyance opening 201 is typically formed in a rectangular shape, and the longitudinal and lateral lengths of the sample conveyance opening 201 are set so as to allow the arm 227, the gripper 228, the microplate held by the gripper 228, and the like to pass through.

As described above, the storage area 28 shown in FIGS. 3 and 4 is provided with a multistage shelf for placing the unused microplate 30d and chip rack 31b, but there are no such shelf in the space on the left of the sample conveyance opening 201, and no obstacles such as microplates and chip racks exist in the space. This is because, as described later, the grip handler 225 conveys the microplate 30c to the autosampler 11 in the horizontal direction.

The units on the table 21 described above can be roughly divided into the following three, those requiring handling of both the liquid handler 224 and the grip handler 225 (group A), those requiring only handling by the grip handler 225 (group B), and those requiring only handling by the liquid handler 224 (group C).

Specifically, the sealer unit 27 and the storage area 28 fall into the group B, the reagent reservoir unit 24 falls into the group C, and the other blocks, except them and the temperature-control plate 23, fall into the group A. In the sample pretreatment device 2 of the present embodiment, the blocks requiring handling by the liquid handler 224, i.e., the group A and the group C, are arranged in the range of La in FIG. 3, and the blocks requiring handling by the grip handler 225, i.e., the group A and the group B, are arranged in the range of Lb in FIG. 3. The range in which La and Lb overlap is a range in which the blocks included in the group A are arranged.

In the sample pretreatment device 2 of the present embodiment, the liquid handler 224 and the grip handler 225 are attached on surfaces of one Z-axis guide 223 opposite to each other, and a rotary drive mechanism that rotates the liquid handler 224 and the grip handler 225 is not provided. Therefore, there are restrictions on the movable range of the liquid handler 224 and the movable range of the grip handler 225 on the X-axis. On the other hand, by appropriately arranging the blocks included in the groups A to C on the table 21 as described above, the liquid handler 224 and the grip handler 225, having the restrictions on the movable range as described above, are each made possible to perform necessary handling. This simplifies the structure of the conveyance mechanism 22, which is advantageous in reducing the installation floor space, compared with the case where the liquid handler 224 and the grip handler 225 are operated separately or one of them is not a linear drive system but a rotary drive system.

Here, the configuration of the autosampler 11 that receives the microplate 30c containing the pretreated sample from the sample pretreatment device 2 will be described.

As shown in FIG. 5, a sample reception opening 111 is formed on the left side wall of a housing 110 of the autosampler 11 facing the sample pretreatment device 2. The sample conveyance opening 201 in the sample pretreatment device 2 and the sample reception opening 111 in the autosampler 11 have substantially the same size in the Y-Z plane, and in a state where the sample pretreatment device 2 and the autosampler 11 are installed at appropriate positions, the sample conveyance opening 201 and the sample reception opening 111 are at substantially the same positions in the X-axis direction. Both the sample conveyance opening 201 and the sample reception opening 111 are set to a size that allows the gripper 228, the microplate held by the gripper 228, and the like can pass through in a state where the sample pretreatment device 2 and the autosampler 11 are arranged in a predetermined positional relationship.

Similar to the sample conveyance opening 201, the sample reception opening 111 is also provided with an openable/closable shutter 112 so that, except when the microplate 30c is conveyed, the shutter 112 can close the sample reception opening 111. When the shutters 202 and 112 are both in an opening state, the space in the housing 20 of the sample pretreatment device 2 and the space in the housing 110 of the autosampler 11 substantially communicate with each other through the sample conveyance opening 201 and the sample reception opening 111.

Figure 2:
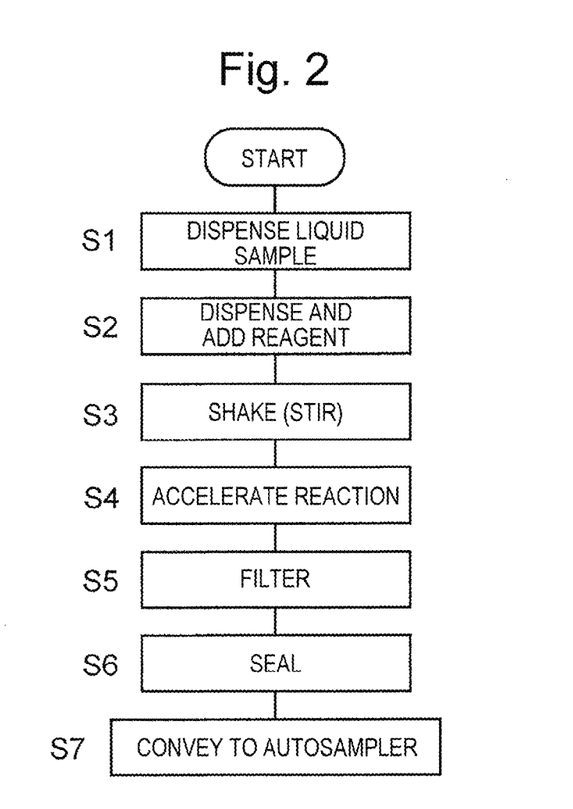
FIG. 2 is a flow diagram showing the flow of the pretreatment operation and steps performed in the sample pretreatment device in the LC-MS analysis system of the present embodiment.

Next, an example of the operation from when the sample pretreatment device 2 carries out pretreatment to when the microplate containing the pretreated liquid sample is conveyed from the sample pretreatment device 2 to the autosampler 11 will be described with reference to the flowchart shown in FIG. 2. Here, it is assumed that the sample that is an analyte is a biological sample such as blood.

The worker opens the door body 203 of the sample pretreatment device, and places, on the temperature-control plate 23, the vial rack 32 in which plural vials each containing a liquid sample have been set. Then, the worker closes the door body 203, and instructs the start of treatment by an operation unit that is not illustrated. The temperature-control plate 23 cools the sample contained in each vial to an appropriate temperature within a range of about 0 to 10° C. This suppresses denaturalization of the components in the sample.

In the sample pretreatment device 2, the liquid handler 224 mounted with the unused chipset 226 is moved to a predetermined position on the vial rack 32, and the liquid handler 224 sucks the liquid sample from each of the plurality (eight) of vials in the vial rack 32 and dispenses the liquid sample into each well of the filter-type microplate 30a placed on the constant-temperature shake unit 26 (step S1). The filter-type microplate used herein is, for example, a microplate having a structure in which, even if an organic solvent is injected inside, the solution does not drop unless vacuum-sucked, e.g., Impact (registered trademark) commercially available from Phenomenex Inc.

At the time of work of step S1, the constant-temperature shake unit 26 is stopped, and its temperature is kept low so as to suppress denaturalization of the sample. The liquid handler 224 dispenses the liquid sample into all the wells of the filter-type microplate 30a by repeating the operation of discarding the used chipset 226 into the waste box 25 and mounting the unused chipset 226 to perform the dispense.

The liquid handler 224 then sucks a prescribed amount of a predetermined reagent from the reagent reservoir placed in the reagent reservoir unit 24 and dispenses it into a predetermined well in the filter-type microplate 30a, thereby adding the reagent to the liquid sample (step S2). This reagent is, for example, a reagent for binding to a specific component in a liquid sample by a chemical reaction to precipitate the specific component, or for denaturing and precipitating protein when the removal target is the protein.

After the reagent is added to the liquid samples in all the wells of the filter-type microplate 30a, the constant-temperature shake unit 26 shakes the filter-type microplate 30a while appropriately raising the temperature, thereby stirring, for a predetermined length of time, the liquid sample to which the reagent has been added (step S3). This accelerates the chemical reaction between the liquid sample and the reagent. In some cases, the reaction is further accelerated by standing under a constant temperature for a predetermined time after stirring (step S4).

After that, the grip handler 225 is moved to a position where the filter-type microplate 30a on the constant-temperature shake unit 26 can be gripped, and the filter-type microplate 30a is gripped and conveyed to the vacuum suction filtration unit 29. The vacuum suction filtration unit 29 filters the liquid sample contained in each well of the filter-type microplate 30a by vacuum suction filtration, and drips the filtrate into the general microplate 30b having been installed in advance in the lower stage of the vacuum suction filtration unit 29, thereby removing the precipitated solid matter (step S5). This removes an unnecessary component and the like in the liquid sample from the liquid sample. Then, the grip handler 225 conveys, to a predetermined position of the sealer unit 27, the microplate 30b in which the liquid sample after the unnecessary component has been removed is stored. The sealer unit 27 attaches a sealing material so as to substantially seal each well of the microplate 30b (step S6). Thus, the series of pretreatment ends.

The grip handler 225 grips the microplate 30c on which the seal is applied, and conveys the microplate, to the inside of the housing 110 of the autosampler 11, through the sample conveyance opening 201 in which the shutter 202 is opened and the sample reception opening 111 in which the shutter 112 is opened (step S7). As shown in FIG. 5, when the grip handler 225 moves to the right end, the arm 227 enters the housing 110 of the autosampler 11 through the sample conveyance opening 201 and the sample reception opening 111. Therefore, after the arm 227 enters a predetermined position in the housing 110 of the autosampler 11, the grip handler 225 is moved downward by a predetermined amount, and the gripper 228 is expanded to release the gripping of the microplate 30c, whereby the microplate 30c can be placed in the predetermined position of the autosampler 11.

It is preferable that each of the shutters 202 and 112 is opened only when the microplate 30c is conveyed from the sample pretreatment device 2 to the autosampler 11, and the sample conveyance opening 201 and the sample reception opening 111 are closed in other periods. Thus, it is possible to prevent temperature change due to intrusion of outside air or the like when the temperature of the internal space of the autosampler 11 or the internal space of the sample pretreatment device 2 is controlled. It is also possible to suppress the electric power consumption for temperature control.

As described above, in the LC-MS analysis system of the present embodiment, the microplate containing the liquid sample for which a predetermined pretreatment has been performed in the sample pretreatment device 2 can be automatically conveyed from the sample pretreatment device 2 to the autosampler 11. Thus, it is possible to reduce the labor of the worker due to this conveyance. Even in a case of use of a reagent or the like harmful to the human body, it is possible to reduce the risk of the worker coming into contact with such a reagent at the time of conveyance work of the microplate. Furthermore, since the configuration of the conveyance mechanism 22 is simple as described above, and the work and treatment by the liquid handler 224 and the grip handler 225 are performed by one X, Y, and Z three-axis drive system, it is possible to reduce the floor space of the sample pretreatment device 2 on the table 21. Thus, it is possible to suppress the installation floor space of the sample pretreatment device 2 and install the sample pretreatment device 2 and the analysis device 1 on a dedicated table with a top plate having a relatively small floor space.

Of course, the pretreatment performed in the sample pretreatment device 2 is not limited to those described above, and appropriate treatments can be combined in accordance with the purpose or the like. For example, not for the purpose of removing an unnecessary component or the like in the sample but for the purpose of labeling or derivatizing a specific component (or a specific site of a specific component) in the sample, the pretreatment may be performed so that a predetermined reagent is added to the sample and shaking is performed in order to accelerate the reaction of the labeling or derivatizing of the sample.

In the sample pretreatment device in the embodiment described above, the liquid handler 224 and the grip handler 225 are provided so as to be integrally movable in the Z-axis direction with respect to the Z-axis guide 223, but the liquid handler 224 and the grip handler 225 may be independently movable in the Z-axis direction with respect to the Z-axis guide 223. In that case, although the number of drive mechanisms increases, the restriction of the movable range of each of the liquid handler 224 and the grip handler 225 decreases, and it becomes possible to utilize the space in the housing 20 more effectively.

It is preferable to provide the shutter 202 that opens/closes the sample conveyance opening 201 of the sample pretreatment device 2 and the shutter 112 that opens/closes the sample reception opening 111 of the autosampler 11. However, these are not essential elements. In particular, since the entire interior of the autosampler 11 is often temperature-controlled, it is desirable that the sample reception opening 111 of the autosampler 11 is provided with the shutter 112. On the other hand, in the sample pretreatment device 2, partial temperature control is performed by the temperature-control plate 23 or the like, but the entire interior of the sample pretreatment device 2 is not necessarily temperature-controlled (of course, it may be temperature-controlled). Therefore, the sample conveyance opening 201 of the sample pretreatment device 2 may not have the shutter 202, but it is preferable to have the shutter 202 in order to prevent dust and the like from entering from the outside as much as possible.

While the positional relationship between the sample pretreatment device 2 and the analysis device 1 is not limited to that shown in FIG. 1, it is preferable that the sample pretreatment device 2 and the autosampler 11 are arranged close to each other.

The system may be configured such that a rack changer is arranged close to the sample pretreatment device, and a microplate and other labware having been pretreated in the sample pretreatment device are conveyed to the rack changer as described above and further transferred from the rack changer to the autosampler.

The housing of the sample pretreatment device and the housing of the analysis device (autosampler or integrated liquid chromatograph) may be configured by one common housing. Even in a case of where the housing is thus commonalized, it is necessary to temperature-control the inside of the autosampler, and hence a wall that separates the sample pretreatment device from the autosampler is formed between them, and the wall is provided with an opening serving as both a sample conveyance opening and a sample reception opening. The opening is provided with a shutter that opens when the sample is conveyed and closes at other times. In such a configuration, it can be said that the wall between the sample pretreatment device and the autosampler is a part of the housing of the sample pretreatment device and the analysis device (or autosampler). In this case, it is not necessary to arrange the sample pretreatment device and the analysis device in the predetermined positional relationship as described above.

The above-described embodiment is merely an example of the present invention, and it is natural that any changes, modifications, and additions made as appropriate within the scope of the present invention are included in the scope of the claims.

REFERENCE SIGNS LIST

1 . . . Analysis Device
11 . . . Autosampler
20, 110 . . . Housing
111 . . . Sample Reception Opening
112, 202 . . . Shutter
12 . . . Liquid chromatograph (LC)
13 . . . Mass Spectrometry (MS)
2 . . . Sample Pretreatment Device
201 . . . Sample Conveyance Opening
203 . . . Door Body
21 . . . Table
22 . . . Conveyance Mechanism
221 . . . X-Axis Guide Rail
222 . . . Y-Axis Guide Rail
223 . . . Z-Axis Guide
224 . . . Liquid Handler
225 . . . Grip Handler
226 . . . Chipset 227 . . . Arm
228 . . . Gripper
23 . . . Temperature-Control Plate
24 . . . Reagent Reservoir Unit
25 . . . Waste Box
251 . . . Waste Port
26 . . . Constant-Temperature Shake Unit
27 . . . Sealer Unit
28 . . . Storage Area
29 . . . Vacuum Suction Unit
30a . . . Filter-Type Microplate
30b, 30c . . . Microplate
30d . . . Unused Microplate
31a, 31b . . . Chip Rack
32 . . . Vial Rack

The invention claimed is:

1. A sample pretreatment device that performs pretreatment of a sample to be analyzed by an analysis device, the sample pretreatment device comprising:
a housing which forms an outer shape of the sample pretreatment device;
a sample conveyance opening formed on a wall of the housing on a side where the analysis device is positioned;
a sample conveyance unit which includes:
a movable body capable of moving in the housing; and
a grip unit provided on a surface of the movable body on a side where the analysis device is positioned, the grip unit being configured to grip a sample container containing a sample having been pretreated in the housing, wherein the sample conveyance unit moves the grip unit in the housing and moves the grip unit to an inside of a housing of the analysis device through the sample conveyance opening and an opening formed in the housing of the analysis device; and
a dispense unit provided on a surface of the movable body on a side opposite to the side where the analysis device is positioned, the dispense unit being configured to suck and discharge a liquid.

2. The sample pretreatment device according to claim 1, further comprising:
a shutter configured to open or close the sample conveyance opening, wherein
the shutter is in an opened state when the sample conveyance unit conveys the sample container from the sample pretreatment device to the analysis device, and
the shutter is in a closed state when the sample conveyance unit does not convey the sample container from the sample pretreatment device to the analysis device.

3. The sample pretreatment device according to claim 1, wherein the sample conveyance opening and the opening of the analysis device are set to a size that allows the grip unit and the sample container gripped by the grip unit to pass through in a state where the sample pretreatment device and the analysis device are arranged in a predetermined positional relationship.

4. The sample pretreatment device according to claim 1, wherein the movable body is capable of linearly moving in three axial directions orthogonal to one another.

5. The sample pretreatment device according to claim 1, wherein the sample conveyance unit does not include a rotary drive mechanism that rotates the grip unit and the dispense unit, and
the movable body linearly moves in three axial directions orthogonal to one another in a state where the grip unit always exists on the side where the analysis device is positioned and the dispense unit always exists on the side opposite to the side where the analysis device is positioned.

6. The sample pretreatment device according to claim 1, wherein the grip unit includes an arm and a gripper, and
a length of the arm and a position of the gripper are set so that when the movable body moves to a predetermined position on the side where the analysis device is positioned, the sample container gripped by the gripper comes to a position corresponding to a location where the sample container is supposed to be arranged in the analysis device.

7. The sample pretreatment device according to claim 1, wherein when an inside of the housing is viewed from top, a dispense-operable region, which is a range in which the dispense unit is movable, and a conveyance-operable region in which the grip unit can perform a conveyance operation are set so as to partially overlap with each other, and
a unit requiring both a dispense operation and a sample conveyance operation in a pretreatment step is arranged in the overlap region, a unit requiring only a dispense operation in a pretreatment step is arranged in the dispense-operable region other than the overlap region, and a unit requiring only a sample conveyance operation in a pretreatment step is arranged in the conveyance-operable region other than the overlap region.

8. The sample pretreatment device according to claim 7, wherein the unit requiring both a dispense operation and a sample conveyance operation in a pretreatment step includes at least one of a vacuum suction filtration unit and a constant-temperature shake unit,
the unit requiring only a dispense operation in a pretreatment step includes a reagent reservoir unit, and
the unit requiring only a sample conveyance operation in a pretreatment step includes at least one of a sealer unit and a storage area.

9. An analysis system including the sample pretreatment device according to claim 1 and the analysis device, wherein
the analysis device includes an analysis device body unit configured to perform analysis, and an autosampler configured to store a plurality of samples to be analyzed in the analysis device body unit, to sequentially select the plurality of samples, to collect selected samples, and to feed them to the analysis device body unit, and
the sample conveyance unit of the sample pretreatment device conveys samples to the autosampler.

10. The analysis system according to claim 9, wherein the analysis device body unit is a liquid chromatograph or a liquid chromatograph mass spectrometer.

11. The analysis system including the sample pretreatment device according to claim 1 and the analysis device, wherein
the housing of the sample pretreatment device and the housing of the analysis device are configured by one common housing.

12. The autosampler used in the analysis system according to claim 9, the autosampler comprising:
a housing; and
a sample reception opening formed on a wall of the housing on a side where the sample pretreatment device is positioned, wherein
the grip unit of the sample conveyance unit configured to grip the sample container containing the sample having been pretreated in the housing of the sample pretreatment device is moved to an inside of the housing of the autosampler through the sample conveyance opening and the sample reception opening.

13. The autosampler according to claim 12, further comprising:
- a shutter configured to open or close the sample reception opening, wherein
- the shutter is in an opened state when the sample conveyance unit conveys the sample container from the sample pretreatment device to the autosampler, and
- the shutter is in a closed state when the sample conveyance unit does not convey the sample container from the sample pretreatment device to the autosampler.

* * * * *